United States Patent
Dor et al.

(10) Patent No.: US 10,002,269 B2
(45) Date of Patent: Jun. 19, 2018

(54) MOBILE HANDHELD ANTENNA FOR READING TAGS

(71) Applicant: HALDOR ADVANCED TECHNOLOGIES LTD, Hod HaSharon (IL)

(72) Inventors: Guy Dor, Rosh Haayn (IL); Dan Zeeli, North York (CA)

(73) Assignee: HALDOR ADVANCED TECHNOLOGIES LTD, Hod Hasharon (IL)

( * ) Notice: Subject to any disclaimer, the term of this patent is extended or adjusted under 35 U.S.C. 154(b) by 0 days. days.

(21) Appl. No.: 14/476,761

(22) Filed: Sep. 4, 2014

(65) Prior Publication Data
US 2016/0070942 A1   Mar. 10, 2016

(51) Int. Cl.
*H04Q 5/22* (2006.01)
*G06K 7/10* (2006.01)
*H04B 5/00* (2006.01)

(52) U.S. Cl.
CPC ....... *G06K 7/10316* (2013.01); *H04B 5/0056* (2013.01); *Y02D 70/166* (2018.01); *Y02D 70/42* (2018.01)

(58) Field of Classification Search
None
See application file for complete search history.

(56) References Cited

U.S. PATENT DOCUMENTS

| | | | | |
|---|---|---|---|---|
| 2003/0105394 A1* | 6/2003 | Fabian | ................... | G01V 15/00 600/407 |
| 2003/0174099 A1* | 9/2003 | Bauer | ................. | G06K 7/0008 343/893 |
| 2006/0043177 A1* | 3/2006 | Nycz | .................... | G06Q 10/087 235/385 |
| 2007/0063817 A1* | 3/2007 | Cherry | ................... | G06K 17/00 340/10.1 |
| 2007/0091006 A1* | 4/2007 | Thober | .................. | H01Q 7/005 343/745 |

(Continued)

FOREIGN PATENT DOCUMENTS

| | | |
|---|---|---|
| EP | 1956516 | 7/2013 |
| JP | 2008-191978 A | 8/2008 |
| KR | 20090109356 | 10/2009 |

*Primary Examiner* — Brian Zimmerman
*Assistant Examiner* — Kevin Lau
(74) *Attorney, Agent, or Firm* — Soroker Agmon Nordman

(57) ABSTRACT

A tag reader, including:
a. a mobile part having an antenna for positioning near a group of tags, transmitting a power signal to the tags and receiving a response from the tags; wherein the antenna has an internal impedance that increases or decreases responsive to objects located in its vicinity;
b. a reader base for providing the power signal to the mobile part and for storing and analyzing information read from tags; and
c. a real-time antenna tuning circuit for adjusting the impedance of the antenna;
wherein the mobile part, reader base and real time antenna tuning circuit are wired together to transfer the power signal from the reader base to the antenna through the real-time antenna tuning circuit, and wherein the real-time antenna tuning circuit monitors the power signal and adjusts the impedance of the antenna responsive to a determination in real-time of power return loss from the antenna.

20 Claims, 4 Drawing Sheets

(56) References Cited

U.S. PATENT DOCUMENTS

| | | | |
|---|---|---|---|
| 2008/0094149 A1* | 4/2008 | Brobston | H03H 7/38 333/17.3 |
| 2008/0186140 A1 | 8/2008 | Kuwako et al. | |
| 2009/0045917 A1* | 2/2009 | Volpi | G01S 13/66 340/10.1 |
| 2010/0130140 A1* | 5/2010 | Waku | H01Q 1/243 455/77 |
| 2010/0201487 A1* | 8/2010 | Halberthal | H01Q 1/2216 340/10.1 |
| 2012/0029349 A1* | 2/2012 | Bruce | A61M 5/14546 600/432 |
| 2013/0093568 A1* | 4/2013 | Gay | G06K 7/10237 340/10.1 |

* cited by examiner

MOBILE HANDHELD ANTENNA FOR READING TAGS

TECHNICAL FIELD

The present invention relates to a mobile handheld antenna for communicating with tags and more specifically communicating with RFID tags.

BACKGROUND

There are many environments in which multiple tools and disposables are used, including for example operation rooms, aircraft hangars, garages, or the like.

An operation room is a facility in which intrusive operations are performed on patients. Typically, multiple people participate in an operation, for example a surgeon, an assistant surgeon, an anesthesiologist, a scrub nurse, and a circulating nurse. The participating personnel members use multiple tools, such as scalpels, forceps, and others, varying according to the surgery being performed.

Intensive efforts are invested in keeping track of all tools and disposables, in order to make sure no tool unintentionally remains inside the patient's body. Therefore careful counting is performed before, during and after the operation.

Counting the tools is a tedious job and requires intensive resources, including mental resources, personnel time and down-time of the operating room. Counting the tools towards the end of an operation also increases the time the patient's body is open with the associated risks.

In addition, counting is not always error-free, and there have been cases in which tools end up being left within the patient's body, causing severe damage and even death.

Another problem relates to the life cycle of tools. For example, the tools used in an operation have to be washed and/or sterilized prior to further usage. Other constraints may relate to maintenance operations required for the tools, for example, a blade may have to be sharpened after every predetermined number of operations in which it is used. In another example, tools that have been used in an operation performed on a patient with a contagious disease may require extra sterilization before further usage, or the like. Making sure that each tool is used and maintained properly also imposes expenses and requires resources, including record keeping and tracking, manual labor and the like.

A computerized system for counting, keeping track of the tools and their maintenance is desirable to enhance dealing with the tools. Such a system needs to uniquely identify each tool. In U.S. Pat. No. 8,193,938 to Halberthal et al dated Jun. 5, 2012 there is disclosed a system and method for keeping track of tools. Identifying tools is performed using a Radio Frequency (RF) identification transducer tag that is attached to the tools.

A tag reader is required to read the tags in a reliable manner. Typically specific shaped containers with stationary readers are used for placing tools before and after use of the tools. The containers are equipped with readers having antennas that are tuned to read RFID tags while taking into account the antenna impedance resulting from the design of the container. It is further desirable to have a mobile reader provided for example in the form of a wand, which can be waved past or suspended in the air over a pile of tools or a container with tools and reliably record the tools based on their tags.

Another reason for using a mobile instrument reader in an operating room is that it dramatically reduces handling time of the tools. In a highly demanding environment where every second counts (staff preparing for an operation, during the operation and in preparing the operating theatre for the next operation), every second saved is monumental to the hospital, and operating team, from the standpoint of patient safety, efficient work flow and cost saving.

However when using a mobile reader instead of a specifically designed container the antenna is more susceptible to interference caused by the environment, for example when being deployed to read a group of tags the mobile reader may move near a large metal object distorting the impedance of the reader and optionally causing the reader to lock up. Likewise when reading tags from various angles the mobile reader may be positioned near various objects such as metals, liquids, people and the like, the antenna will assume different impedance values leading to unreliable results when reading a group of tags.

SUMMARY

An aspect of an embodiment of the disclosure relates to a system and method for reading tags having a mobile part that is moved by a user to be near or hover over a group of tags (e.g. at a distance of up to about 20 cm from the tags). The mobile part includes an antenna for communicating with RFID tags. The system includes a real-time antenna tuning circuit to adjust the impedance of the antenna in the mobile part to overcome interference caused by the influence of objects near the antenna when communicating with tags.

In an exemplary embodiment of the disclosure, the real-time antenna tuning circuit receives a power signal from a reader base and provides the signal to the antenna. The antenna provides a response signal from which the real time antenna tuning circuit can determine a power return loss that depends on the impedance of the antenna. In an exemplary embodiment of the disclosure, the real-time antenna tuning circuit increases or decreases the impedance of the antenna to overcome impedance changes that stem from objects in the vicinity of the antenna while being deployed to read tags.

In an exemplary embodiment of the disclosure, real-time antenna tuning circuit includes an array of controllable elements including capacitors, resistors and/or inductors positioned in sequence or in parallel. Real-time antenna tuning circuit activates or deactivates elements as needed to counteract the influence of the objects near the antenna when attempting to read tags.

There is thus provided according to an exemplary embodiment of the disclosure, a tag reader, comprising:

a. a mobile part including an antenna for positioning near a group of tags, transmitting a power signal to the tags and receiving a response from the tags; wherein the antenna has an internal impedance that increases or decreases responsive to objects located in its vicinity;

b. a reader base for providing the power signal to the mobile part and for storing and analyzing information read from tags;

c. a real-time antenna tuning circuit for adjusting the impedance of the antenna;

Wherein the mobile part, reader base and real time antenna tuning circuit are wired together to transfer the power signal from the reader base to the antenna through the real-time antenna tuning circuit;

Wherein the real-time antenna tuning circuit monitors the power signal and adjusts the impedance of the antenna responsive to a determination in real-time of power return loss from the antenna.

In an exemplary embodiment of the disclosure, the real-time antenna tuning circuit is installed in the mobile part.

Alternatively, the real-time antenna tuning circuit is installed in a separate encasement. Further alternatively, the real-time antenna tuning circuit is installed in the reader base.

In an exemplary embodiment of the disclosure, the tag reader includes a docking station to position the mobile part in a stationary position. Optionally, the real-time antenna tuning circuit includes an array of controllable capacitors/resistors/inductors in sequence or in parallel that can each be turned on or off to increase or decrease the impedance of the antenna. Optionally, the real-time antenna tuning circuit includes an array of controllable capacitors in parallel that can each be turned on or off to increase or decrease capacitance of the antenna. In an exemplary embodiment of the disclosure, some of the capacitor of the array have distinct values. Optionally, the real-time antenna tuning circuit includes a motion detector. In an exemplary embodiment of the disclosure, the antenna impedance is adjusted only when the motion detector detects that the real-time antenna tuning circuit is in motion. Optionally, the real-time antenna tuning circuit adjusts the impedance of the antenna to keep the power return loss within pre-selected limits. In an exemplary embodiment of the disclosure, the real-time antenna tuning circuit adjusts the impedance of the antenna to keep the power return loss substantially stable.

There is further provided according to an exemplary embodiment of the disclosure, a method of reading tags by a tag reader having a reader base and a mobile part, comprising:

Positioning the mobile part including an antenna near a group of tags; wherein the antenna has an internal impedance that increases or decreases responsive to objects located in its vicinity;

Receiving by a real-time antenna tuning circuit connecting between the reader base and the mobile part a power signal from the reader base;

Providing the power signal to the antenna of the mobile part and receiving a response from the antenna;

Determining an antenna power return loss by the real-time antenna tuning circuit from the provided signal and the response;

Comparing the power return loss to pre-selected limits;

Adjusting the antenna impedance to keep the return loss within the pre-selected limits.

In an exemplary embodiment of the disclosure, the real-time antenna tuning circuit includes an array of controllable capacitors/resistors/inductors in sequence or in parallel that can each be turned on or off to increase or decrease the impedance of the antenna. Optionally, the real-time antenna tuning circuit includes an array of controllable capacitors in parallel that can each be turned on or off to increase or decrease capacitance of the antenna. In an exemplary embodiment of the disclosure, some of the capacitor of the array have distinct values. Optionally, the real-time antenna tuning circuit includes a motion detector. In an exemplary embodiment of the disclosure, the antenna impedance is adjusted only when the motion detector detects that the real-time antenna tuning circuit is in motion. Optionally, the real-time antenna tuning circuit adjusts the impedance of the antenna to keep the power return loss within pre-selected limits. In an exemplary embodiment of the disclosure, the real-time antenna tuning circuit adjusts the impedance of the antenna to keep the power return loss substantially stable.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1:
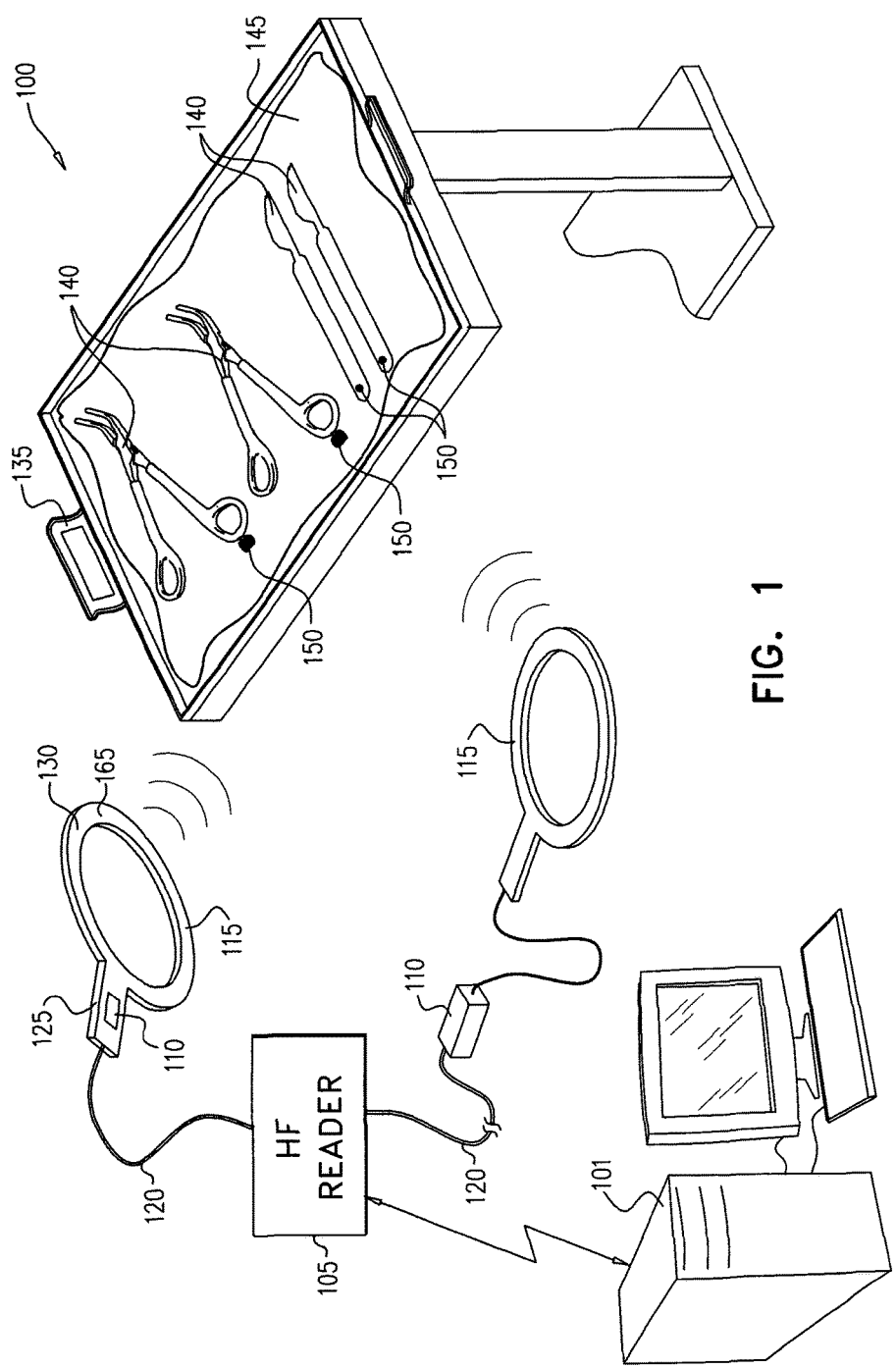
FIG. 1 is a schematic illustration of a system for reading tags connected to tools, according to an exemplary embodiment of the disclosure.

FIG. 1 is a schematic illustration of a system 100 for reading tags 150 connected to tools 140, according to an exemplary embodiment of the disclosure. System 100 includes a reader base 105 for providing a power signal and receiving information read from tags 150 (e.g. identification codes). Optionally, reader base 105 includes a computer based device having a processor and memory and is programmed to receive, store and analyze the information to allow tracking of tools 140 based on the identity information in their attached tags 150. In an exemplary embodiment of the disclosure, the readings from a reader base 105 may be transmitted over a network or communication channel to a host computer 101 for further analysis.

In an exemplary embodiment of the disclosure, reader base 105 is connected by a wire/cable to a mobile part 115 that is used to communicate with the tags 150 by being positioned in their vicinity, for example waving mobile part 115 over the tools 140 connected to the tags 150 usually at a distance of up to 15-20 cm. Optionally, mobile part 115 may be shaped as a paddle or a wand, for example having a handle 125 extending from a central part 165 to allow a user to easily grasp the mobile part 115 and hover over the tools 140. In an exemplary embodiment of the disclosure mobile part 115 is connected by a cable 120 to reader base 105 to transfer the information read from tags 150 and to receive a power signal. In some embodiments of the disclosure, a single reader base 105 may support multiple mobile readers 115 and/or stationary readers (e.g. a container, with an embedded reader, which is not designed to be waved around over tools 140).

In an exemplary embodiment of the disclosure, mobile part 115 includes a real-time antenna tuning circuit (RAT) 110 to automatically adjust the impedance of an internal antenna 130 that is used for transmitting and receiving information from tags 150. Optionally, under the influence of heavy metal objects—antenna 130 is influenced to have a non-optimal impedance value, for example an impedance value that is too high or too low, which would prevent reader base 105 from communicating with the antenna 130. Likewise under the influence of air or the lack of interfering solid metal objects in the vicinity of mobile part 115—antenna 130 is influenced to have an optimal impedance value. Impedance changes during use of mobile part 115 interfere with the correct reading of the information from tags 150. Additionally, reader base 105 is designed to shut down if the impedance reaches extreme values (e.g. extremely higher or lower than the optimal value) to protect it from being damaged. Optionally, real-time antenna tuning circuit 110 counteracts the changes and prevents the impedance from changing drastically (e.g. no more than +/−30-50 Ohm) responsive to objects in the vicinity of mobile part 115.

In some embodiments of the disclosure, real-time antenna tuning circuit 110 may be located in an independent enclosure as a separate element that is connected by a wire/cable to mobile part 115 and reader base 105. Alternatively, real-time antenna tuning circuit 110 is installed in reader base 105 and communicates by wire/cable with mobile part 115.

In an exemplary embodiment of the disclosure, tools 140 are placed on a collection surface 145 or in a container so that mobile part 115 can traverse a group of tools 140 and record their tags 150. Optionally, a docking station 135 is attached to collection surface 145 to enable mobile part 115 to be docked in the docking station 135 so that it may also serve as a stationary reader.

Figure 2:
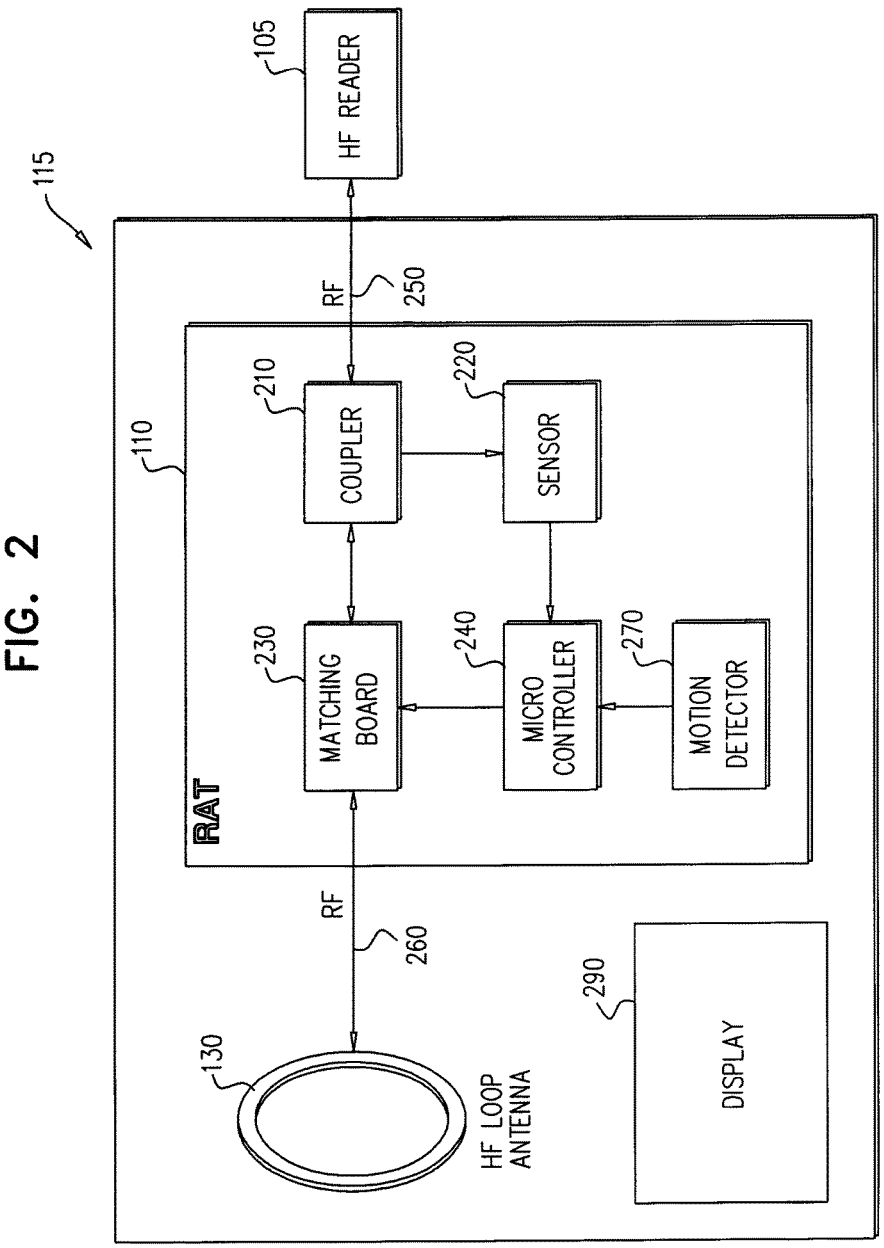
FIG. 2 is a schematic illustration of a mobile reader for reading tags attached to tools, according to an exemplary embodiment of the disclosure.

FIG. 2 is a schematic illustration of mobile part 115 for reading tags 150 attached to tools 140, according to an exemplary embodiment of the disclosure. Optionally, mobile part 115 receives a power signal 250 from reader base 105, for example a high frequency RF signal. Mobile part 115 transmits the signal using antenna 130 and receives feedback from antenna 130. In an exemplary embodiment of the disclosure, real-time antenna tuning circuit 110 includes a directional coupler 210 that continuously samples signal 250 from reader base 105 relative to a response signal 260 received from antenna 130. Optionally, a sensor 220 is connected to coupler 210 to measure the return loss of antenna 130 from response signal 260 and power signal 250 to determine the current impedance. In an exemplary embodiment of the disclosure, the measurements of sensor 220 are transmitted to a microcontroller 240 that calculates an adjustment to compensate for a change in the impedance detected from the measurements.

In an exemplary embodiment of the disclosure, microcontroller 240 instructs a matching board 230 to increase or reduce resistance/inductance/capacitance of antenna 130 to keep the measured impedance stable or within a limited range of allowed values. Optionally, reader base 105 may require that the impedance of antenna 130 remain within a limited range of allowed values to prevent reader base 105 from locking up.

In some embodiments of the disclosure, real-time antenna tuning circuit 110 includes a motion detector 270 to identify if mobile part 115 is in motion or stationary. In some embodiments of the disclosure, real-time antenna tuning circuit 110 may implement real time antenna tuning only when the mobile reader is in motion and its position may affect the impedance readings. Optionally, when the mobile part 115 is stationary real-time antenna tuning circuit 110 may be turned off.

In an exemplary embodiment of the disclosure, mobile part 115 includes a display 290 or other type of visual indicator (e.g. led lights) to provide an indication to the user that all the items/tools expected to be found in a specific location have been found. Optionally, if host computer 101 or reader 105 determine that a specific tool at the location did not respond they will provide a visual and/or audio indication, In an exemplary embodiment of the disclosure, display 290 may show a picture of the missing tool to make it easier for the user to locate it. Optionally, the display 290 may serve as an indication for the user to keep waving mobile part 115 until display 290 indicates that all the expected tools were located.

Figure 3:
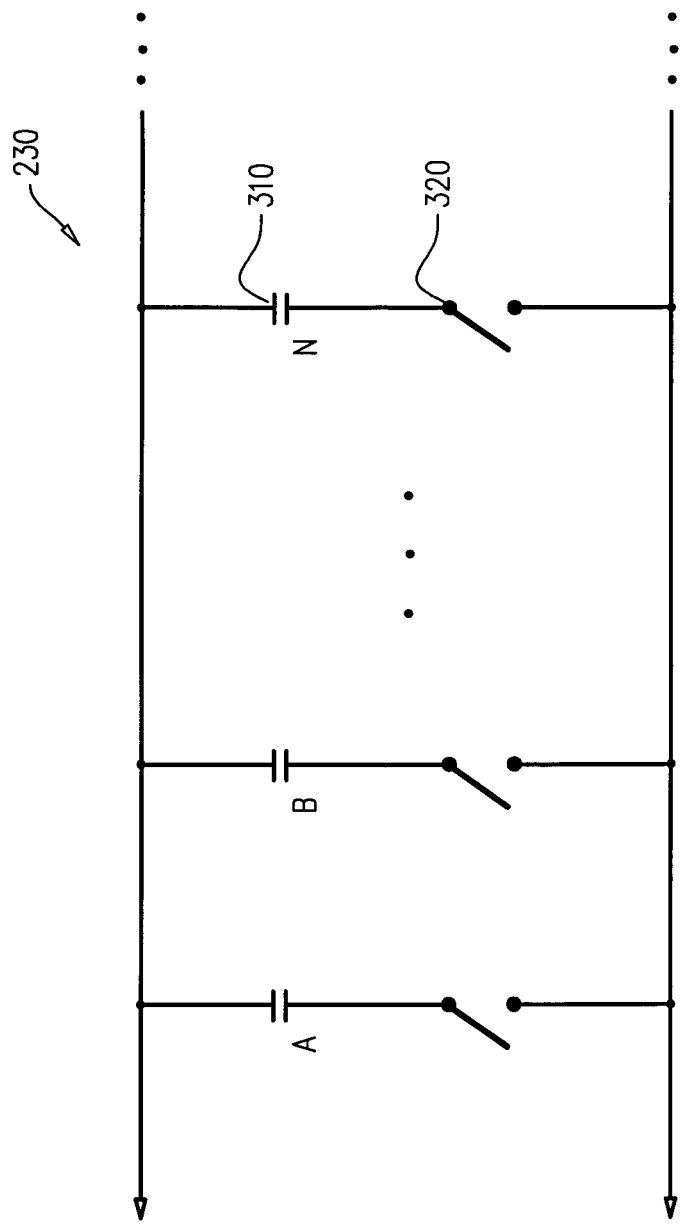
FIG. 3 is a schematic illustrations of an matching board for controlling the impedance of an antenna for reading tags, according to an exemplary embodiment of the disclosure.

FIG. 3 is a schematic illustrations of matching board 230 for controlling the impedance of an antenna for reading tags, according to an exemplary embodiment of the disclosure. In an exemplary embodiment of the disclosure, matching board 230 includes an array of capacitors 310 controlled by switches 320, wherein each capacitor can be turned on or off by a switch to add or remove parallel capacitors. Optionally, microcontroller 240 controls the impedance of antenna 130 by turning switches 320 on or off as needed. In an exemplary embodiment of the disclosure, matching board 230 is designed to be able to keep response signal 260 within the limits accepted by reader base 105, even if mobile part 115 is deployed near a metal board or any other object that can have an effect on the impedance of antenna 130. Optionally, by adjusting the impedance real-time antenna tuning circuit 110 prevents reader base 105 from receiving signals that are out of range or that will cause reader base 105 to disconnect or shut down. Alternatively or additionally, matching board 230 may include controllable resistors/inductors/capacitors (elements) connected in sequence or in parallel to control the impedance of antenna 130. In some embodiments of the disclosure, all the elements may have the same value or some of the elements may have distinct values and are turned on or off selectively to achieve a calculated impedance value.

Figure 4:
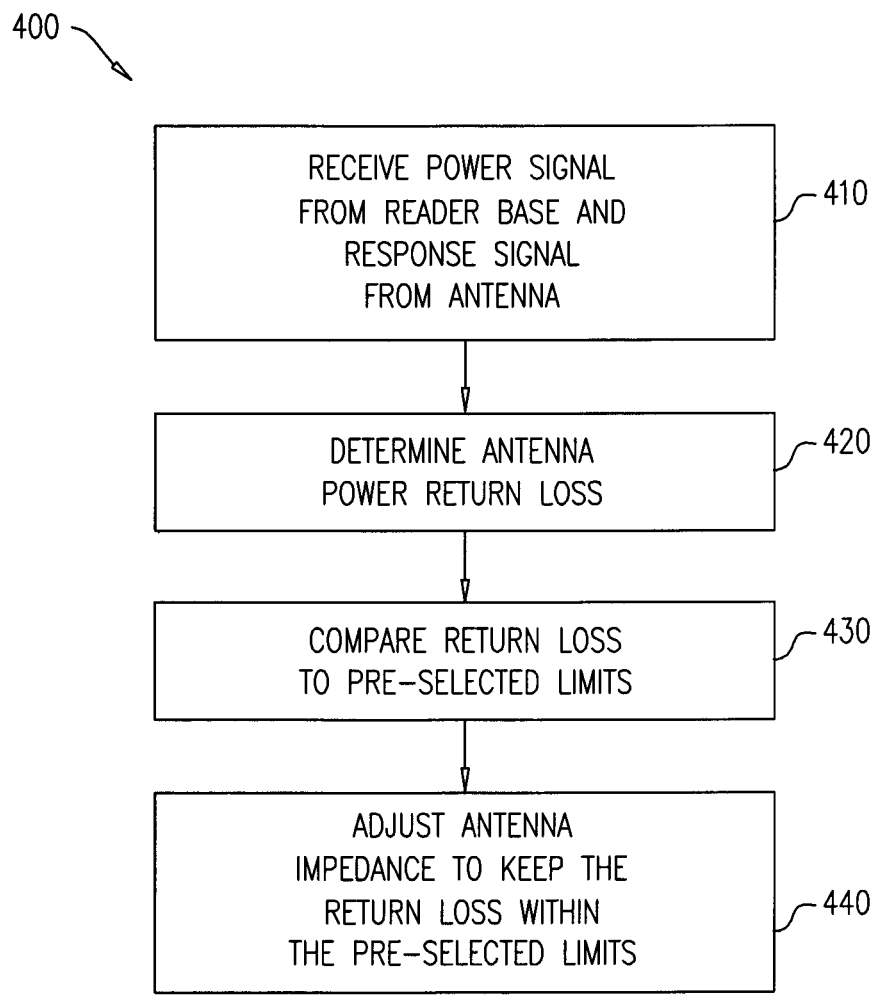
FIG. 4 is a flow diagram of a method of tuning impedance of an antenna in a mobile reader, according to an exemplary embodiment of the disclosure.

FIG. 4 is a flow diagram of a method 400 of tuning impedance of antenna 130 in a mobile part 115, according to an exemplary embodiment of the disclosure. In an exemplary embodiment of the disclosure, coupler 210 continuously receives (410) a power signal (e.g. an HF RF carrier signal) from reader base 105 to search for tags 150. The power signal is provided to antenna 130 and antenna 130 provides a response signal to the coupler 210. The response signal is dependent on the impedance of antenna 130, which is affected by objects in the vicinity of the antenna, for example at a distance of up to about 15-20 cm or at most 50-60 cm.

In an exemplary embodiment of the disclosure, sensor 220 determines (420) the antenna power return loss from the signals at coupler 210. Optionally, sensor 220 provides the value of the power return loss to microcontroller 240 to compare (430) it to pre-selected limits or to previous values to determine if the impedance of antenna 130 has changed and needs to be adjusted to keep it in a range required for reader base 105 or to keep it substantially stable. In an exemplary embodiment of the disclosure, microcontroller 240 opens or closes switches 320 of matching board 230 to adjust (440) the impedance of antenna 130 so that the power return loss will stay in real-time within the pre-selected limits or even remain substantially stable. Optionally, the adjustment is performed by closing or opening switches 320 to increase or decrease the resistance/inductance/capacitance of antenna 130.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

We claim:
1. A tag reader, comprising:
 a. a mobile part including an antenna for positioning near a group of tags attached to items, transmitting a power signal to the tags and receiving a response from the tags; wherein the antenna has an internal impedance that increases or decreases responsive to objects located in its vicinity;
 b. a reader base for providing the power signal to the mobile part and for storing and analyzing information read from tags; wherein the information includes an identification code of each tag;
 c. a real-time antenna tuning circuit for adjusting the impedance of the antenna;
 wherein the real time antenna tuning circuit includes a sensor for determining power return loss of the antenna in real time;
 wherein the mobile part, reader base and real time antenna tuning circuit are wired together to transfer the power signal from the reader base to the antenna through the real-time antenna tuning circuit;
 wherein the real-time antenna tuning circuit monitors the power signal and adjusts the impedance of the antenna responsive to determining the power return loss; and
 wherein the mobile part includes a display that provides an indication if all the items attached to the group of tags were located; and
 wherein the real-time antenna tuning circuit is installed in the mobile part and connected by a cable to the reader base.
2. A tag reader according to claim 1, further comprising a docking station to position the mobile part in a stationary position to serve as a stationary reader of items in the vicinity of the reader.
3. A tag reader according to claim 1, wherein the real-time antenna tuning circuit includes an array of controllable capacitors/resistors/inductors in sequence or in parallel that can each be turned on or off to increase or decrease the impedance of the antenna.
4. A tag reader according to claim 1, wherein the real-time antenna tuning circuit includes an array of controllable capacitors in parallel that can each be turned on or off to increase or decrease capacitance of the antenna.
5. A tag reader according to claim 4, wherein some of the capacitor of the array have distinct values.
6. A tag reader according to claim 1, wherein the real-time antenna tuning circuit includes a motion detector.
7. A tag reader according to claim 6, wherein the antenna impedance is adjusted only when the motion detector detects that the real-time antenna tuning circuit is in motion.
8. A tag reader according to claim 1, wherein the real-time antenna tuning circuit adjusts the impedance of the antenna to keep the power return loss within pre-selected limits.
9. A tag reader according to claim 1, wherein the real-time antenna tuning circuit adjusts the impedance of the antenna to keep the power return loss stable.
10. A method of reading tags by a tag reader having a reader base and a mobile part, comprising:
 positioning the mobile part including an antenna near a group of tags attached to items; wherein the antenna has an internal impedance that increases or decreases responsive to objects located in its vicinity;
 receiving by a real-time antenna tuning circuit connecting between the reader base and the mobile part a power signal from the reader base; wherein the real-time antenna tuning circuit is installed in the mobile part and connected by a cable to the reader base;
 providing the power signal to the antenna of the mobile part and receiving a response from the antenna;
 determining an antenna power return loss by a sensor in the real-time antenna tuning circuit from the provided signal and the response;
 adjusting the antenna impedance responsive to the determination in real-time of the power return loss from the antenna;
 reading information from the tags; wherein the information includes an identification code of each tag;
 storing and analyzing the information to determine if all the tags of the group were located; and
 wherein the mobile part includes a display that provides an indication if all the items attached to the group of tags were located.
11. A method according to claim 10, wherein the real-time antenna tuning circuit includes an array of controllable capacitors/resistors/inductors in sequence or in parallel that can each be turned on or off to increase or decrease the impedance of the antenna.
12. A method according to claim 10, wherein the real-time antenna tuning circuit includes an array of controllable capacitors in parallel that can each be turned on or off to increase or decrease capacitance of the antenna.
13. A method according to claim 12, wherein some of the capacitor of the array have distinct values.
14. A method according to claim 10, wherein the real-time antenna tuning circuit includes a motion detector.
15. A method according to claim 10, wherein the antenna impedance is adjusted only when the motion detector detects that the real-time antenna tuning circuit is in motion.
16. A method according to claim 10, wherein the real-time antenna tuning circuit adjusts the impedance of the antenna to keep the power return loss within pre-selected limits.
17. A method according to claim 10, wherein the real-time antenna tuning circuit adjusts the impedance of the antenna to keep the power return loss stable.
18. A tag reader according to claim 1, wherein the display is configured to show a picture of a missing item to help the user to locate the item.
19. A method according to claim 10, wherein the display is configured to show a picture of a missing item to help the user to locate the item.
20. A method according to claim 10, wherein the tag reader includes a docking station to position the mobile part in a stationary position to serve as a stationary reader of items in the vicinity of the reader.

* * * * *